United States Patent
Bledsoe

(10) Patent No.: US 11,273,623 B2
(45) Date of Patent: Mar. 15, 2022

(54) COMPOSITE PANEL CONTAINING LAUAN OR OTHER MOISTURE-CARRYING OR MOISTURE-ABSORBING MATERIAL USING ADHESION PROMOTER

(71) Applicant: Crane Composites, Inc., Channahon, IL (US)

(72) Inventor: James G. Bledsoe, Goshen, IN (US)

(73) Assignee: Crane Composites, Inc., Channahon, IL (US)

(*) Notice: Subject to any disclaimer, the term of this patent is extended or adjusted under 35 U.S.C. 154(b) by 0 days.

(21) Appl. No.: 16/805,658

(22) Filed: Feb. 28, 2020

(65) Prior Publication Data
US 2020/0199411 A1 Jun. 25, 2020

Related U.S. Application Data

(62) Division of application No. 15/588,082, filed on May 5, 2017, now Pat. No. 10,597,559.

(Continued)

(51) Int. Cl.
*B32B 17/06* (2006.01)
*B32B 37/12* (2006.01)
*C09J 5/02* (2006.01)

(52) U.S. Cl.
CPC .......... *B32B 17/062* (2013.01); *B32B 37/12* (2013.01); *C09J 5/02* (2013.01); *B32B 2255/08* (2013.01);
(Continued)

(58) Field of Classification Search
CPC ... B44C 5/0423; B44C 5/0453; B32B 17/062; B32B 37/12; B32B 2255/08; B32B 2255/26; B32B 2307/406; B32B 2607/00; B32B 21/02; B32B 21/04; B32B 21/08; B32B 21/10; B32B 21/12; B32B 21/14;
(Continued)

(56) References Cited

U.S. PATENT DOCUMENTS 3,320,203 A 5/1967 Kellert
3,840,617 A * 10/1974 Demmler ................ C08L 67/06
525/13

(Continued)

FOREIGN PATENT DOCUMENTS

WO 2014118210 A1 8/2014
WO 2015168670 A1 11/2015

OTHER PUBLICATIONS

Definition of "curing" from http://wordnetweb.princeton.edu/perl/webwn date unknown.*

(Continued)

*Primary Examiner* — John L Goff, II

(57) ABSTRACT

A composite panel includes a mold surface, a layer of gel coat applied to the mold surface, a wet laminate containing a resin applied to the layer of gel coat, a substrate of lauan or another moisture-carrying or moisture-absorbing material placed on the wet laminate, and a layer of a bonding promoter provided at the interface of the substrate with the wet laminate, additional to any amount of promoter(s) present in the resin of the wet laminate. Without previously curing or drying the layer consisting essentially of the bonding promoter in the solvent, each of the wet laminate, the bonding promoter, and the gel coat are simultaneously cured.

17 Claims, 5 Drawing Sheets

Related U.S. Application Data

(60) Provisional application No. 62/345,946, filed on Jun. 6, 2016.

(52) U.S. Cl.
CPC ..... *B32B 2255/26* (2013.01); *B32B 2307/406* (2013.01); *B32B 2607/00* (2013.01)

(58) Field of Classification Search
CPC ... B32B 2260/026; B32B 2317/16; C09J 5/02
See application file for complete search history.

(56) References Cited

U.S. PATENT DOCUMENTS

| | | | |
|---|---|---|---|
| 4,350,788 A | 9/1982 | Shimokawa et al. | |
| 4,390,401 A | 6/1983 | Costanza | |
| 4,678,532 A | 7/1987 | Perry et al. | |
| 5,110,392 A | 5/1992 | Ito et al. | |
| 5,741,594 A | 4/1998 | Jialanella | |
| 6,212,846 B1 | 4/2001 | Johnston | |
| 8,071,491 B2 | 12/2011 | Balthes et al. | |
| 8,221,874 B1 | 7/2012 | Zhao et al. | |
| 8,778,458 B2 | 7/2014 | Nagelsdiek et al. | |
| 9,144,955 B2 | 9/2015 | Jaffee | |
| 2005/0183813 A1 | 8/2005 | Gonsalves et al. | |
| 2008/0263967 A1* | 10/2008 | Culveyhouse | E04B 1/3431 52/67 |
| 2009/0017316 A1* | 1/2009 | Kato | C08L 79/04 428/447 |
| 2009/0068477 A1 | 3/2009 | Buck | |
| 2010/0068497 A1 | 3/2010 | Harrington | |
| 2010/0181018 A1 | 7/2010 | Walczyk et al. | |
| 2012/0048598 A1 | 3/2012 | Kaimori et al. | |
| 2014/0113126 A1 | 4/2014 | Rowitsch et al. | |
| 2014/0220355 A1 | 8/2014 | Nagelsdiek et al. | |
| 2015/0375478 A1 | 12/2015 | Gruhn et al. | |
| 2016/0032158 A1 | 2/2016 | Tang et al. | |

OTHER PUBLICATIONS

Vick, "Adhesive Bonding of Wood Materials", Chap. 9 of USDA Forest Service, Forest Products Laboratory, Wood Handbook: Wood as an Engineering Material., 1999. General technical report FPL ; GTR-113, pp. 9.1-9.24.

\* cited by examiner

COMPOSITE PANEL CONTAINING LAUAN OR OTHER MOISTURE-CARRYING OR MOISTURE-ABSORBING MATERIAL USING ADHESION PROMOTER

CROSS-REFERENCE TO RELATED APPLICATION(S)

This application is a divisional of U.S. patent application Ser. No. 15/588,082, filed May 5, 2017, now U.S. Pat. No. 10,597,559, which claims priority to U.S. Provisional Patent Application No. 62/345,946, filed Jun. 6, 2016, the disclosures of which are incorporated herein by reference.

TECHNICAL FIELD

The present disclosure relates to a composite panel. More specifically, this disclosure relates to a composite panel containing lauan or another moisture-carrying or moisture-absorbing material using an adhesion promoter.

BACKGROUND

This invention relates to an improved method of manufacturing a composite panel using lauan and the panel made using the method (while the method is applicable to panels using lauan or other moisture-carrying or moisture-absorbing materials, reference will for the most part be limited to lauan, in the interest of conciseness). In the conventional production of composite panels with lauan, a gel coat layer is first laid down on a mold, followed by a layer of resin and glass fibers, thus forming a wet laminate. A layer of lauan is then applied directly to the wet laminate. The resin contains one or more promoters, and depending on the resin used, peroxide may also be added to the resin just before it is introduced into the mold. The peroxide acts as a cure initiator by reacting with the promoter and causing the resin to polymerize and harden. It additionally results in the resin bonding to the lauan, forming a flat, hard composite sheet.

Sometimes the lauan, although apparently exhibiting acceptable adhesion, does not form a strong bond to the cured laminate, resulting in a panel that can undergo delamination. The present inventor has determined that this problem is more likely to occur with increased water content of the lauan. The inventor thus believes that the problem is due to excess moisture in the lauan, and that this water inhibits the cure of the resin at the interface by interfering with the reaction between peroxide and promoter, resulting in poor adhesion to the lauan. Unfortunately, attempting to solve this problem by simply adding extra promoter to the resin is not practical. The extra promoter changes the speed at which polymerization occurs, thus causing timing problems in the production process, as well as increasing consumption of the promoter.

One might attempt to manage this problem by inspecting all lauan for moisture content before using it. This reduces the likelihood of producing panels that are subject to delamination, but requires extra labor for the inspection, as well as storing the high-moisture lauan and returning it to the vendor. Similarly, attempting to dry the too-moist pieces of lauan before use would require still more labor, as well as requiring the availability of drying equipment and use of energy for the drying process.

SUMMARY

The present method involves applying promoter at the resin-substrate (e.g., lauan) interface. This is preferably done by spraying the promoter onto the top surface of the resin before the lauan is placed on top, but it may instead be done by spraying or rolling the promoter onto the lauan itself. Most generally, it may be done by providing promoter at the resin-lauan interface in any manner that may be convenient (provided that little to no extra promoter is added to the rest of the resin layer). The present inventor has found that doing this may reduce the likelihood of delamination even with lauan that happens to have a high moisture content that would otherwise be problematic, and in fact, may enable one to reduce or even practically eliminate the problem rather than just managing it.

According to certain embodiments, a method of manufacturing a lauan composite panel, and the panel so made, are provided. A layer of gel coat is formed on a mold surface, a wet laminate containing a resin is applied to the layer of gel coat on the mold surface, a lauan or other substrate is placed on the wet laminate, and the combination is cured. Prior to curing, there is provided a layer of a bonding promoter at the interface of the lauan substrate with the wet laminate, additional to any amount of promoter(s) present in the resin of the wet laminate.

The features and advantages herein will become more apparent from the detailed description set forth below when taken in conjunction with the drawings, in which like reference numbers indicate identical or functionally similar elements.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure are by way of illustration only and should not be construed in any way to limit the scope of the disclosure. Those skilled in the art will understand that the principles of the present disclosure may be implemented in any suitably arranged method or device.

As stated above, the conventional method of manufacturing a lauan composite panel involves forming a layer of gel coat on the surface of a mold of at least the size of the panel to be made. On the gel coat is formed a wet laminate, of a resin containing a promoter and possibly peroxide, and fiber glass fibers as a reinforcement. The wet laminate may be sprayed onto the gel coat, such as by spraying the resin onto the gel coat, followed by (or mixed with) the glass fibers, and then rolling the surface of the layer to achieve evenness. A sheet of lauan is then positioned on the wet laminate; for a typical panel, a number of pieces of lauan are actually used, and are placed abutting each other to cover the wet laminate.

The wet laminate is then cured. This may be done by encasing the entire mold in a vacuum bag, exposing the mold with the gel coat and other layers on it to a vacuum, and applying heat. Alternatively, heat alone may be used.

Figure 1:
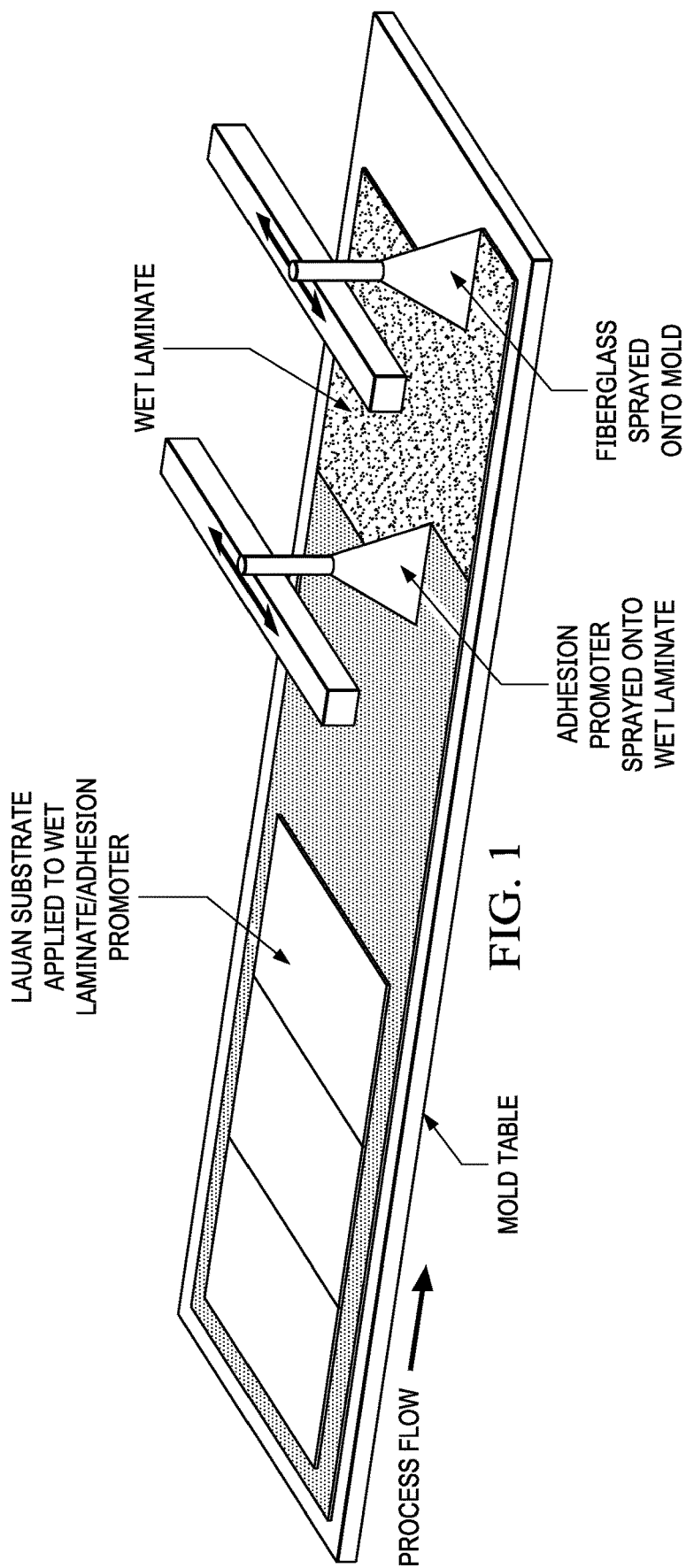
FIG. 1 is an illustration of one preferred embodiment of a method according to the present invention.

FIG. 1 illustrates one preferred embodiment of a method according to the present disclosure. A horizontal flat mold is provided, and is coated with a gel coat layer (not illustrated). A first spray head, shown toward the right in that Figure, is used to spray the mix of resin and glass fibers onto the gel coat. As in a conventional method, this mix may also include a promoter in an amount sufficient to achieve proper polymerization of the resin during curing, but should not contain so much as to change the curing time.

A second spray head sprays promoter onto the wet laminate, as shown to the left of the first spray head. This promoter may be the same as is included in the wet laminate itself, but that need not be the case, as discussed below. The wet laminate, coated with the promoter by the second spraying head, is then covered with the required number of pieces of lauan. (To be more precise, the wet laminate may not be exactly and completely covered by the lauan, as a peripheral portion of the laminate may remain uncovered.)

When the entire mold has been provided with each of the mentioned layers, it is enclosed in a vacuum bag (not illustrated), and the resin of the wet laminate is cured under vacuum and heat. Alternatively, other techniques of curing may be used. The finished panel is then released from the mold and cut to size if necessary.

Figure 4:
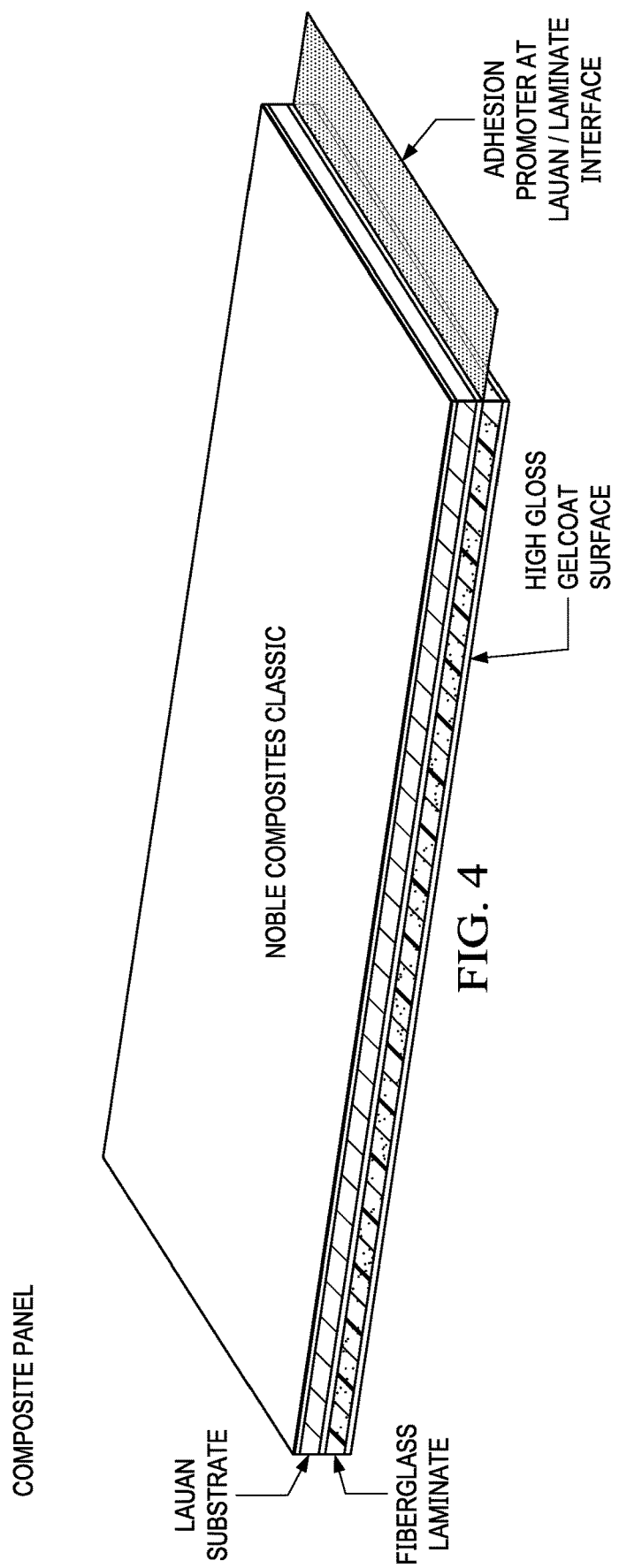
FIG. 4 is an illustration of a panel made according to the process of FIG. 1, 2 or 3.
Figure 5:
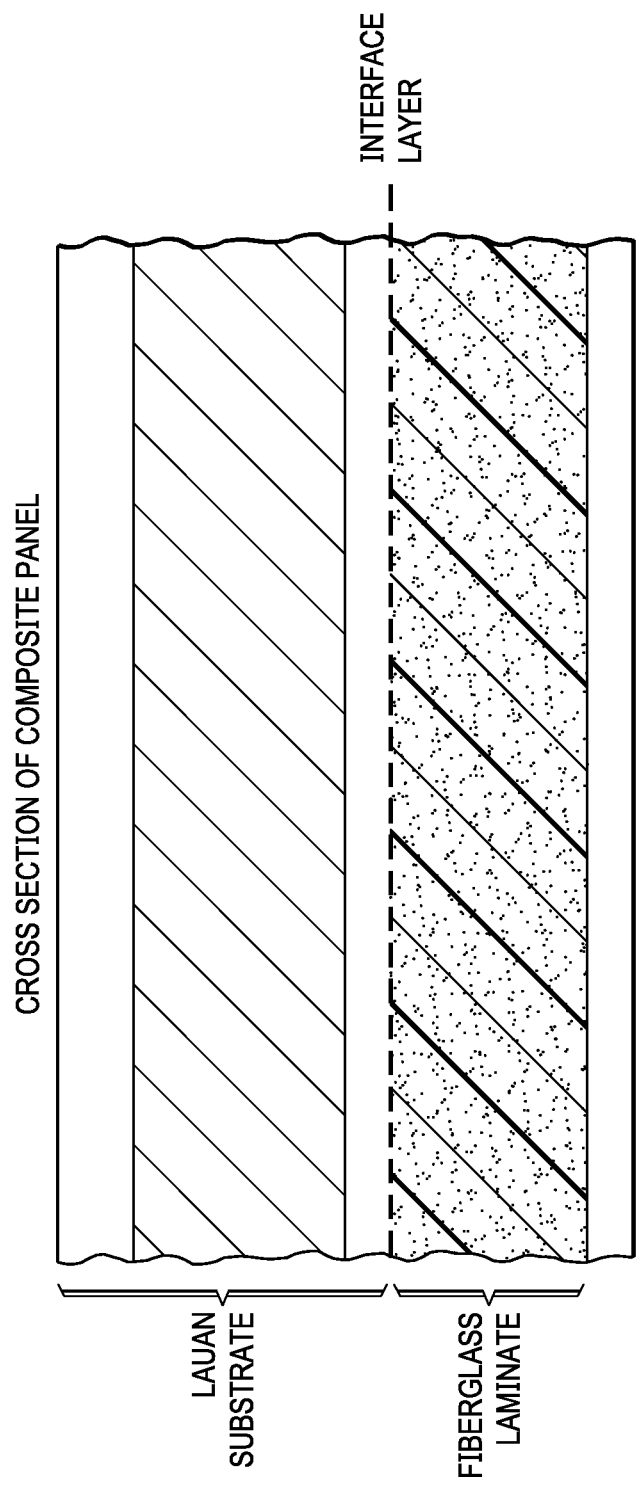
FIG. 5 is a cross-sectional view of the panel shown in FIG. 4.

An example of a panel manufactured in this fashion is shown in FIGS. 4 and 5. As may be seen, one surface of the panel is formed by the lauan substrate, which is bonded to the fiberglass laminate. The other side of the laminate is bonded to the high-gloss gel coat. In both Figures the interface layer between the lauan substrate and the fiberglass laminate is labeled, and the thin layer of adhesion promoter is illustrated as well (see FIG. 4).

While reference has been made above simply to a promoter being applied to the lauan-laminate interface, in practice of course what is applied is a solution of the promoter(s), so that what is applied includes one or more promoters, a solvent, and if needed a material to dilute the concentration of the promoter(s) to the desired value. It is believed that the following may be used as suitable promoters, although it should be understood that neither this list nor the following list of solvents is intended to be exhaustive:

Promotors, including but not limited to:
  Copper salts
  Manganese salts
  Iron salts
  Cobalt salts
  Amine accelerators
  Dimethyl aniline
  Dimethyl-p-toluidine
  Vanadium accelerators
  Vanadium monobutyl dihydrophosphite
  2,4-Pentanedione
  N,N-Diethylacetoacetamide Solvents, including but not limited to:
  Mineral spirits
  Methyl ethyl ketone
  Styrene
  Acetone
  Methyl methacrylate
  Xylene The mixture ratio of solvent to promoter can range, for example, from 10:1 to 1000:1, or more particularly from 20:1 to 800:1, or from 50:1 to 500:1, or from 100:1 to 300:1.

One preferred embodiment applies 1% cobalt-acetone drying solution as the solvent-promoter mixture, applied to the lauan with target coverage of 3 grams/square foot (about 32 grams/square meter). Another example uses cobalt with mineral spirits. Other mixtures, as stated, may be used.

Also, the promoter used in the solvent-promoter mixture may be one (or more) also used in the resin, or instead may include one or more not used in the resin.

Figure 2:
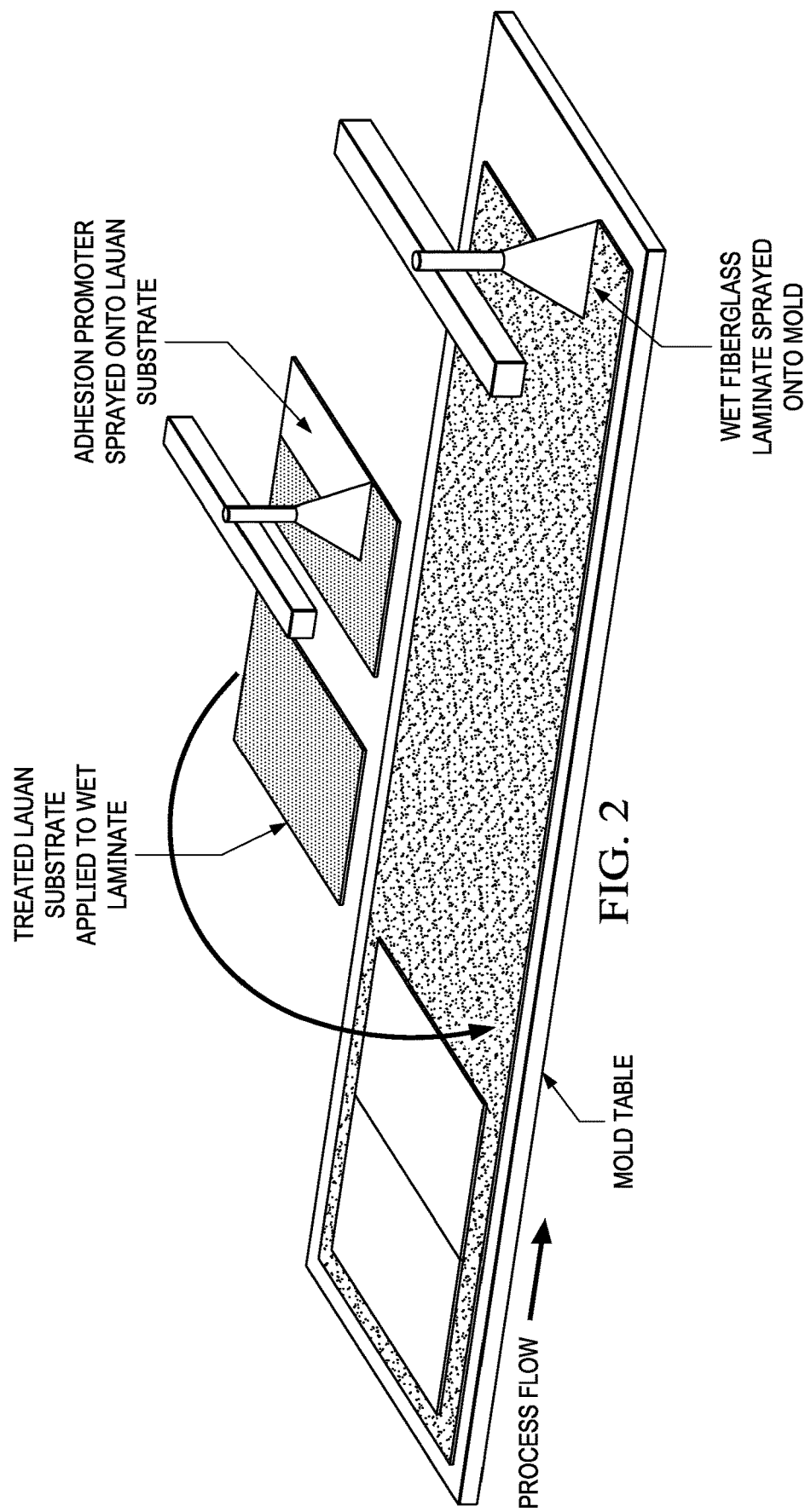
FIG. 2 is an illustration of a second preferred embodiment.

While the embodiment described above with reference to FIG. 1 is particularly preferred due to the ease of manufacturing the product using that embodiment, other embodiments are also contemplated. A second example of a preferred embodiment of the method is illustrated in FIG. 2. In that embodiment, instead of spraying the promoter onto the wet laminate, the promoter is sprayed onto one surface of the lauan shortly before the lauan is positioned on the wet laminate. Each sheet of lauan, after being sprayed with the proper amount of promoter solution, is turned over and placed with the sprayed surface in contact with the wet laminate.

Figure 3:
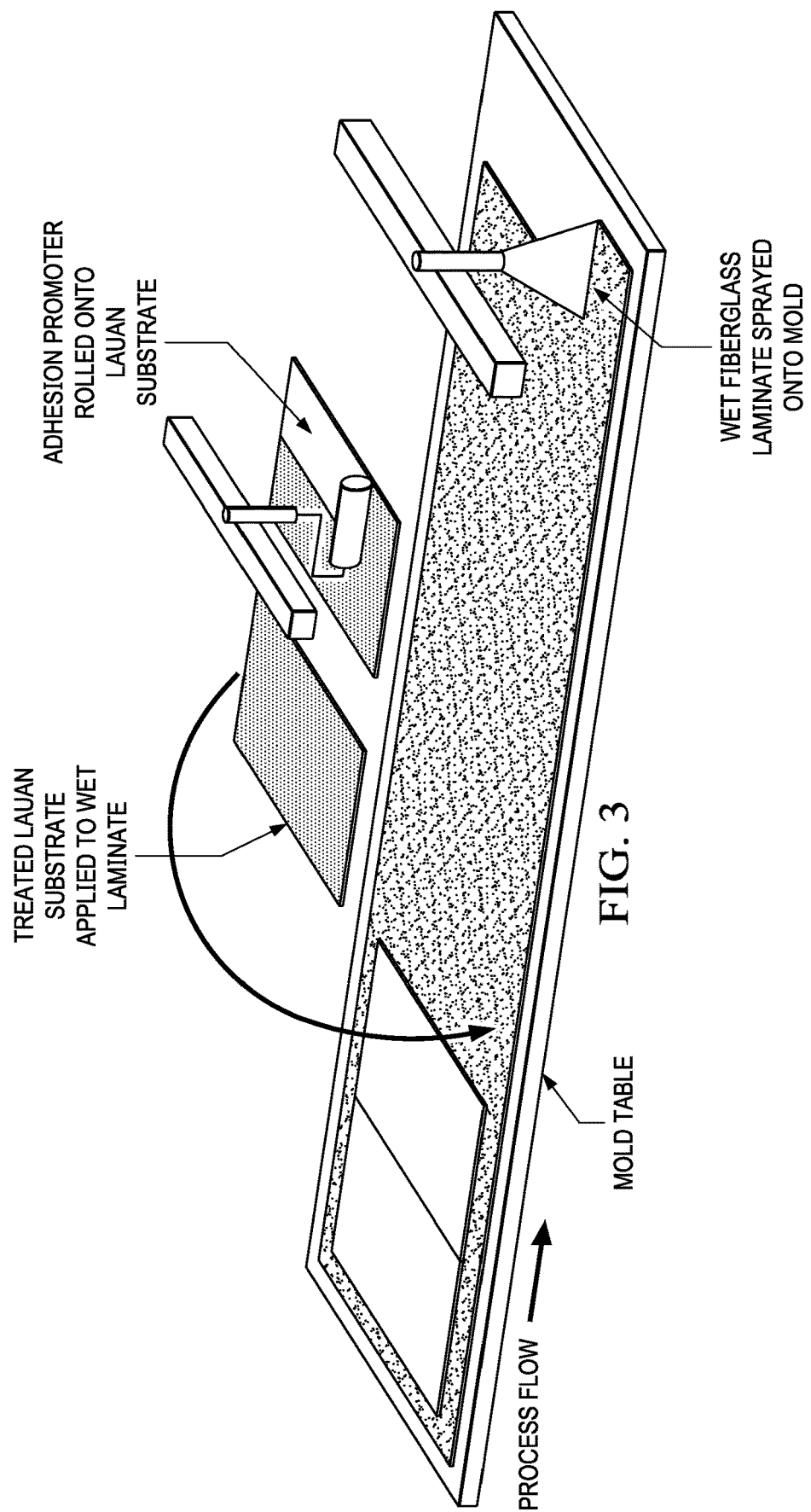
FIG. 3 is an illustration of a third preferred embodiment.

Another example is illustrated in FIG. 3, in which the promoter solution is again applied to the lauan rather than to the wet laminate, but the application is done using a roller rather than a spray head. Similarly, to FIG. 2, after application of the promoter, each sheet of lauan is inverted and positioned with the coated surface in contact with the wet laminate. In both variants (FIGS. 2 and 3), the rest of the procedure is the same as in that illustrated in FIG. 1.

Additional variations in the method are within the broad scope of the present invention. For example, while only application by spraying or by use of a roller have been mentioned, any other mechanized or manual method of application of the promoter that may be found convenient may be used. Also, an individual mold may be used for each panel, or a continuous mold may be used. Again, the mold may be moved past each work station in turn for application of the gel coat, of the wet laminate, of the promoter and of the lauan, and then for the curing, or alternatively the mold may be stationary.

Results obtained have been good, based on testing including for regularity of product surface or surface profile, and mechanical, such as flex, tensile and, block pull tests, with moisture contents from 0to 19% (and, particularly, with high moisture content, of e.g., 13-18% and especially 14-17%; all % are weight-%). Moreover, the inventor has found that advantageous results may be obtained regardless of whether the lauan used is sanded or not, and for different thicknesses of lauan. Additionally, the method may yield advantageous results whether the resin used contains a filler, such as mica, or not. Further, it is believed that this method may produce satisfactory results with any moisture content up to the level at which the lauan would be unacceptable based on other criteria.

Furthermore, while this method has been described with particular relation to the manufacture of a panel having a lauan substrate bonded to a resin-fiberglass layer that is bonded to a gel coat, the method is applicable as well to the manufacture of other types of article in which it is desired to bond lauan or a similar material to a resin layer, whether containing glass fibers or not. The method is also applicable to other woods than lauan, such as plywood, and to other substrates that may carry or absorb moisture.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

Although the present disclosure has been described with various embodiments, various changes and modifications may be suggested to one skilled in the art. It is intended that the present disclosure encompass such changes and modifications as falling within the scope of the claims.

The present disclosure should not be read as implying that any particular element, step, or function is an essential element, step, or function that must be included in the scope of the claims. Moreover, the claims are not intended to invoke 35 U.S.C. § 112(f) unless the exact words "means for" are followed by a participle.

What is claimed is:

1. A composite panel, comprising:
    a gel coat applied to a mold surface;
    a laminate layer positioned on a surface of the gel coat, the laminate layer comprising a resin that includes a first bonding promoter;
    a substrate of lauan positioned above the laminate layer and the gel coat; and
    a layer consisting essentially of a second bonding promoter in a solvent positioned along an interface of the substrate with the laminate layer, the second bonding promoter including manganese salts,
    wherein the laminate layer is positioned between the gel coat and the substrate,
    wherein, without previously curing or drying the layer consisting essentially of the second bonding promoter in the solvent, each of the laminate layer, the second bonding promoter, and the gel coat are simultaneously cured, and
    wherein the first bonding promoter is different than the second bonding promoter.

2. The composite panel of claim 1, wherein the layer consisting essentially of the second bonding promoter in the solvent is applied to an exposed surface of the laminate layer.

3. The composite panel of claim 2, wherein the layer consisting essentially of the second bonding promoter in the solvent is applied to the exposed surface of the laminate layer before the substrate is placed on the laminate layer.

4. The composite panel of claim 2, wherein the layer consisting essentially of the second bonding promoter in the solvent is sprayed onto the exposed surface of the laminate layer.

5. The composite panel of claim 4, wherein the layer consisting essentially of the second bonding promoter in the solvent is sprayed onto the exposed surface of the laminate layer before the substrate is placed on the laminate layer.

6. The composite panel of claim 1, wherein the layer consisting essentially of the second bonding promoter in the solvent is applied to an exposed surface of the substrate.

7. The composite panel of claim 6, wherein the layer consisting essentially of the second bonding promoter in the solvent is applied to the exposed surface of the substrate before the substrate is placed on the laminate layer.

8. The composite panel of claim 6, wherein the layer consisting essentially of the second bonding promoter in the solvent is sprayed onto the exposed surface of the substrate.

9. The composite panel of claim 6, wherein the layer consisting essentially of the second bonding promoter in the solvent is rolled onto the exposed surface of the substrate.

10. The composite panel of claim 1, wherein the layer consisting essentially of the second bonding promoter in the solvent is positioned by applying a solution of the second bonding promoter in the solvent in a concentration of the solvent to the second bonding promoter in a range of 10:1 to 1000:1, inclusive.

11. The composite panel of claim 10, wherein the layer consisting essentially of the second bonding promoter in the solvent is positioned by applying the solution of the second bonding promoter containing a material selected from the group consisting of copper salts, iron salts, and cobalt salts.

12. The composite panel of claim 10, wherein the layer consisting essentially of the second bonding promoter in the solvent is positioned by applying the solution of the second bonding promoter containing a material selected from the group consisting of amine accelerators, dimethyl aniline, dimethyl-p-toluidine, vanadium accelerators, vanadium monobutyl dihydrophosphite, 2,4-pentanedione, and N,N-diethylacetoacetamide.

13. The composite panel of claim 10, wherein the layer consisting essentially of the second bonding promoter in the solvent is positioned by applying the solution containing a material selected from the group consisting of mineral spirits, methyl ethyl ketone, styrene, acetone, methyl methacrylate and xylene as the solvent.

14. The composite panel of claim 1, wherein the resin further includes glass fibers.

15. The composite panel of claim 1, wherein the substrate has a moisture content of up to 19 weight %.

16. The composite panel of claim 1, wherein the substrate has a moisture content of 13-18 weight %.

17. The composite panel of claim 1, wherein the substrate has a moisture content of 14-17 weight %.

* * * * *